United States Patent [19]
Kitao et al.

[11] Patent Number: 4,792,010
[45] Date of Patent: Dec. 20, 1988

[54] FOUR WHEEL DRIVE VEHICLE

[75] Inventors: Yuichi Kitao, Ashiya; Akio Inamori, Izumi, both of Japan

[73] Assignee: 501 Kubota, Ltd., Osaka, Japan

[21] Appl. No.: 37,858

[22] Filed: Apr. 13, 1987

[30] Foreign Application Priority Data

Jul. 11, 1986 [JP] Japan ................................ 61-163988
Jul. 11, 1986 [JP] Japan ................................ 61-163989
Jul. 11, 1986 [JP] Japan ................................ 61-163990

[51] Int. Cl.4 ........................ B60K 17/34; B60K 23/08
[52] U.S. Cl. .................................... 180/233; 180/53.1; 180/247; 180/248; 192/67 A; 192/93 A
[58] Field of Search ............... 180/233, 197, 244, 247, 180/248; 192/67 A, 93 A

[56] References Cited
U.S. PATENT DOCUMENTS 4,597,467  7/1986  Stockton ........................ 180/233 X
4,650,028  3/1987  Eastman et al. ................ 180/248 X
4,650,029  3/1987  Foote et al. .................... 180/197 X

FOREIGN PATENT DOCUMENTS 1387170 12/1964 France ................................ 180/233

Primary Examiner—David M. Mitchell
Assistant Examiner—Mitchell J. Hill
Attorney, Agent, or Firm—Webb, Burden, Ziesenheim & Webb

[57] ABSTRACT

A four wheel drive vehicle comprising an engine, a transmission connected to the engine, a front wheel drive line, a rear wheel drive line, and an automatic switch mechanism for operatively connecting the front wheel and rear wheel drive lines to the transmission to selectively provides a two wheel drive mode and a four wheel drive mode. The front wheel drive line and the rear wheel drive lines are constructed such that front wheels are driven at a lower speed than rear wheels. The automatic switch mechanism includes an input portion connected to the transmission, a first output portion connected to the front wheel drive line, a second output portion connected to the rear wheel drive line, and a clutch for connecting the first and second output portions to the input portion. The clutch is operable to disconnect the first output portion from the input portion upon receipt of a torque exceeding a predetermined value.

4 Claims, 6 Drawing Sheets

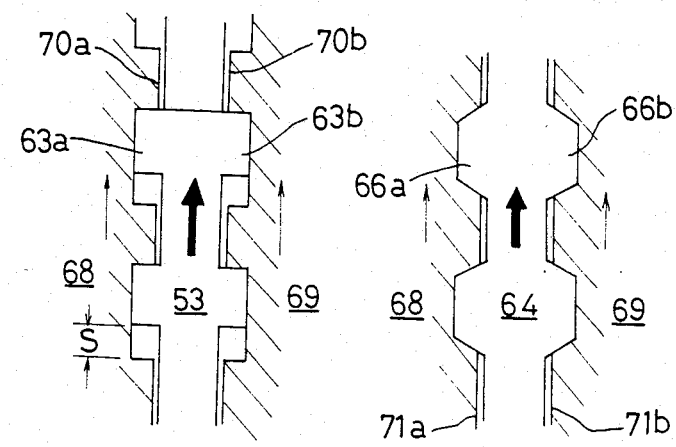
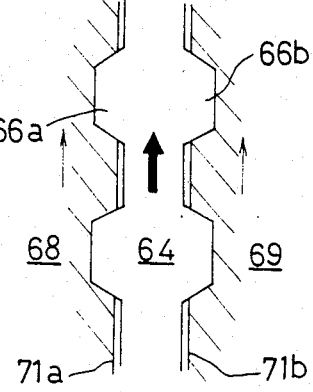
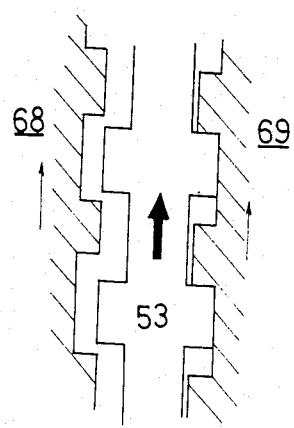
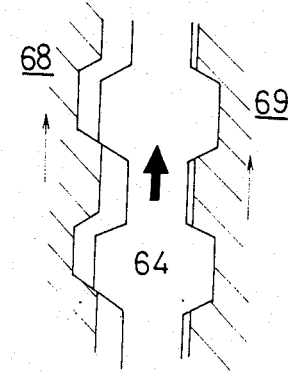

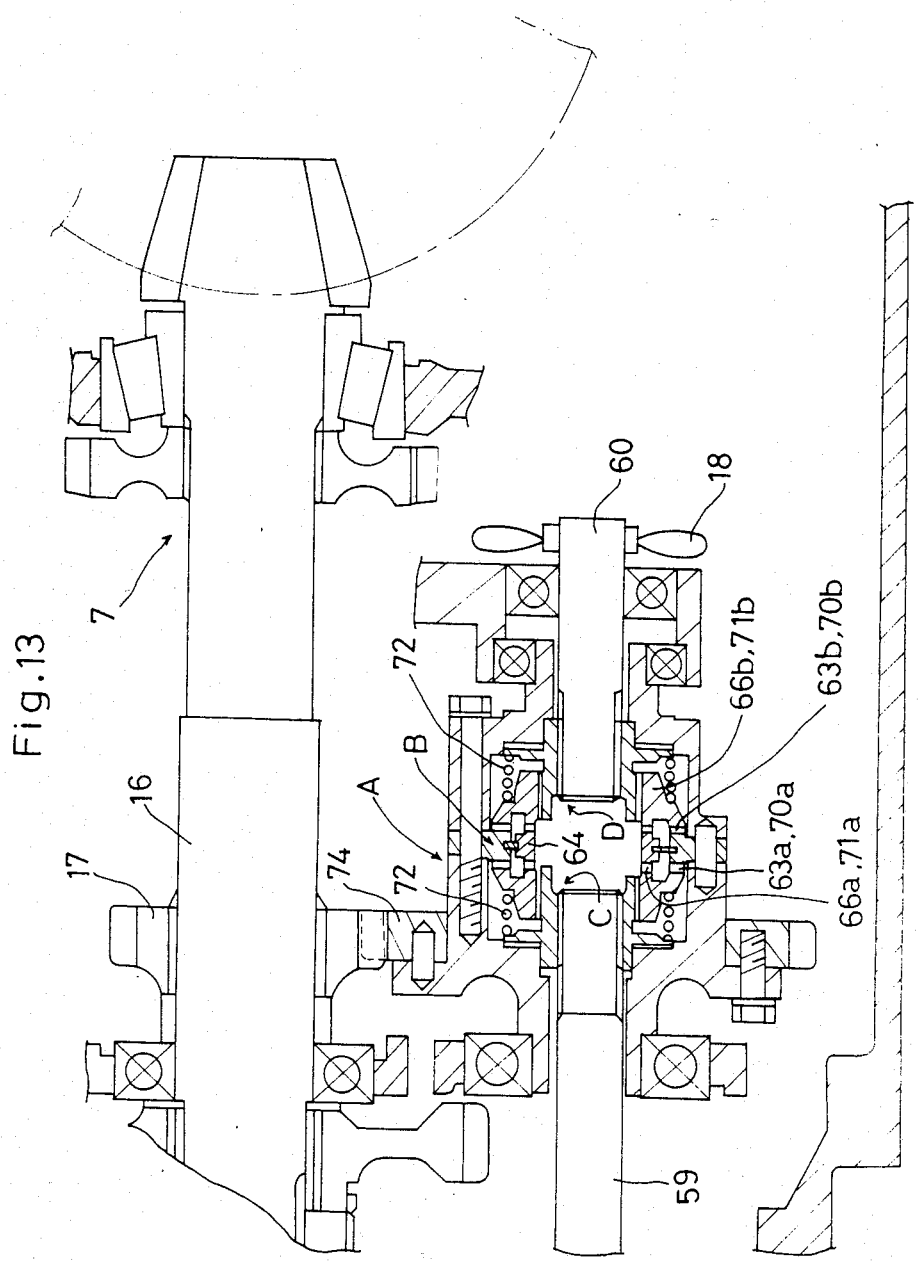

FOUR WHEEL DRIVE VEHICLE

BACKGROUND OF THE INVENTION

The present invention relates to a vehicle, particularly a tractor, which is switchable between a two wheel drive mode and a four wheel drive mode.

A four wheel drive vehicle wherein front wheels and rear wheels are driven simultaneously is well known. It is desirable that the front wheels and rear wheels are driven at an equal vehicle speed when the vehicle travels straight in the four wheel drive mode. However, when the vehicle makes a turn as shown in FIG. 14 of the accompanying drawings, a turning radius R2 of front wheels FW is greater than a turning radius R1 of rear wheels RW. Therefore, the vehicle has a great turning radius unless the vehicle speed of the front wheels is increased over the vehicle speed of the rear wheels. The vehicle speed of the front wheels herein means a vehicle speed realized by the rotation of the front wheels, and the vehicle speed of the rear wheels means a vehicle speed realized by the rotation of the rear wheels.

Thus, it is necessary for the four wheel drive vehicle to have different vehicle speeds of the front and rear wheels for straight running and turning. However, it is extremely difficult to change the vehicle speeds of the front and rear wheels to be optimal speeds now for straight running, now for turning, since a four wheel drive mechanism for distributing the drive of an engine to the front wheels and rear wheels normally comprises transmission gears.

A proposal has been made to set the vehicle speed of the front wheels to be faster than that of the rear wheels, thereby causing either the front wheels or the rear wheels (the front wheels in the case of a tractor) to slip relative to the ground when the vehicle runs straight, and permitting the vehicle to make a turn within a small radius by the high speed rotation of the front wheels.

In another proposal made heretofore, the front wheels and the rear wheels have the vehicle speed ratio of about 1:1 and a one-way clutch is mounted between front wheel driving shafts for transmitting the drive only from the engine to the front wheels and not vice versa. According to this construction, the four wheel drive mode is selected for straight running whereas, when the vehicle makes a turn, the one-way clutch is operated to break the drive transmission and place the front wheels in free rotation thereby to permit the vehicle to turn within a small radius.

A further proposal already made comprises a switch mechanism for selectively providing a two wheel drive mode and a four wheel drive mode. According to this construction, the vehicle is driven only by the rear wheels when running straight and by the four wheels when making a turn or when the rear wheels slip.

The construction in which the front wheels are set to a higher vehicle speed than the rear wheels has the problem of wearing tires through the slips occurring between the front wheels and the ground. The construction including a one-way clutch has the problem of rendering engine brakes unavailable. The construction for selectively providing the two wheel drive mode and four wheel drive mode has the problems of involving troublesome operations and of poor vehicle maneuverability.

SUMMARY OF THE INVENTION

The object of the present invention is to provide a four wheel drive vehicle which is automatically switchable between a two wheel drive mode and a four wheel drive mode when necessary, relieves the driver of the troublesome lever operation, is free from the problems of earth displacement at a turning time and of tire wear occurring when the vehicle runs straight, realizes economical fuel consumption by selecting the two wheel drive mode in normal situations, and avails itself of engine brakes.

In order to achieve the above object, a four wheel drive vehicle according to the present invention comprises an engine, transmission means connected to the engine, a front wheel drive mechanism driven by a drive output from the transmission means, a rear wheel drive mechanism driven by the drive output from the transmission means, the front wheel drive mechanism and the rear wheel drive mechanism being constructed such that front wheels are driven at a lower speed than rear wheels, and an automatic switch mechanism for selectively providing a two wheel drive mode and a four wheel drive mode, the automatic switch mechanism including an input portion connected to the transmission means, a first output portion having a first output shaft connected to the front wheel drive mechanism, a second output portion including a second output shaft subjected to a rotational load, clutch means operable to disconnect the first output portion from the input portion when the input portion rotates at a lower speed than the first output portion at a time the vehicle is driven by the engine with power transmission occurring from the input portion to the first output portion and the second output portion, and when the input portion rotates at a higher speed than the first output portion at a time the vehicle is braked by the engine with power transmission occurring from the first output portion and the second output portion to the input portion.

According to this construction, the rear wheels are constantly driven by the engine through the automatic switch mechanism. A clutch and change speed mechanisms are of course provided between the engine and the rear wheels and the drive transmission from the engine is broken as necessary.

The front wheels also are driven by the engine through the automatic switch mechanism, but the drive transmission to the front wheels may be broken by operating the clutch means. When the vehicle runs, both the front wheels and rear wheels are driven thereby tending to establish the four wheel drive mode. Since the front wheels are set to a lower vehicle speed than the rear wheels, the front wheels are pushed by the rear wheels and tend to rotate faster than the set velue when the vehicle runs straight. More particularly, the rotational rate NF of the front wheels driven by the engine is lower than the rotational rate NR of the rear wheels driven by the engine. As a result, when the vehicle is running, the rear wheels push it and the front wheels rotate at substantially the same rate NR as the rear wheels. The difference between NR and NF is added by the rear wheels forcing the front wheels, via the ground, to rotate substantially at the rate NR. This phenomenon is referred to hereinafter as a propulsive force. In other words, the propulsive force imparted from the ground causes the front wheels to rotate at a high speed. As a result, the first output portion tends to rotate at a higher rate than the input portion. Since the clutch means is operable in this state to break the drive transmission between the input portion and the first output portion, the input portion and the first output portion become rotatable relative to each other. Consequently, the front wheels rotate, following the ground, at the same vehicle speed as the rear wheels without slipping against the ground. In other words, the vehicle is driven in this state only by the rear wheels.

When the vehicle makes a turn in this state, the front wheels rotate at a higher vehicle speed than a set speed whereby the clutch means between the input portion and the first output portion acts to break the drive transmission therebetween, and thus the vehicle is driven by the rear wheels.

On the other hand, when the rear wheels slip for some reason to reduce the vehicle speed, the rotational rate of the front wheels becomes lower and the rotational rates of the front and rear wheels become equal in the end. Then the clutch means acts to effect the drive transmission between the input portion and the first output portion whereby the front wheels are driven by the engine, establishing the four wheel drive mode. This frees the rear wheels from the slippage.

When the engine brake is applied, the front and rear wheels receive a propulsive force from the ground. Then, since the front wheels are set to a lower vehicle speed than the rear wheels, the front wheels will rotate faster than the set speed if the rear wheels rotate at the set speed. In other words, the first output portion tends to rotate faster than the input portion. In this state, the clutch means acts to provide the drive transmission between the input portion and the first output portion, whereby the engine brake is applied to the front wheels.

When the front wheels slip for some reason without receiving a braking force from the engine, the rotational rate of the front wheels falls below that of the rear wheels. Consequently, the clutch means becomes disengaged and the engine brake is applied only to the rear wheels.

Other features and advantages of the present invention will be apparent from the following description.

BRIEF DESCRIPTION OF THE DRAWINGS

FIGS. 3 through 12 are explanatory views illustrating engagement and disengagement of clutch teeth and cam teeth constituting clutch means of the automatic switch mechanism, FIG. 13 is a sectional view of a region of a transmission system including an automatic switch mechanism for switching between a two wheel drive mode and a four wheel drive mode according to a second embodiment of the invention.

DESCRIPTION OF THE PREFERRED EMBODIMENTS

Figure 1:
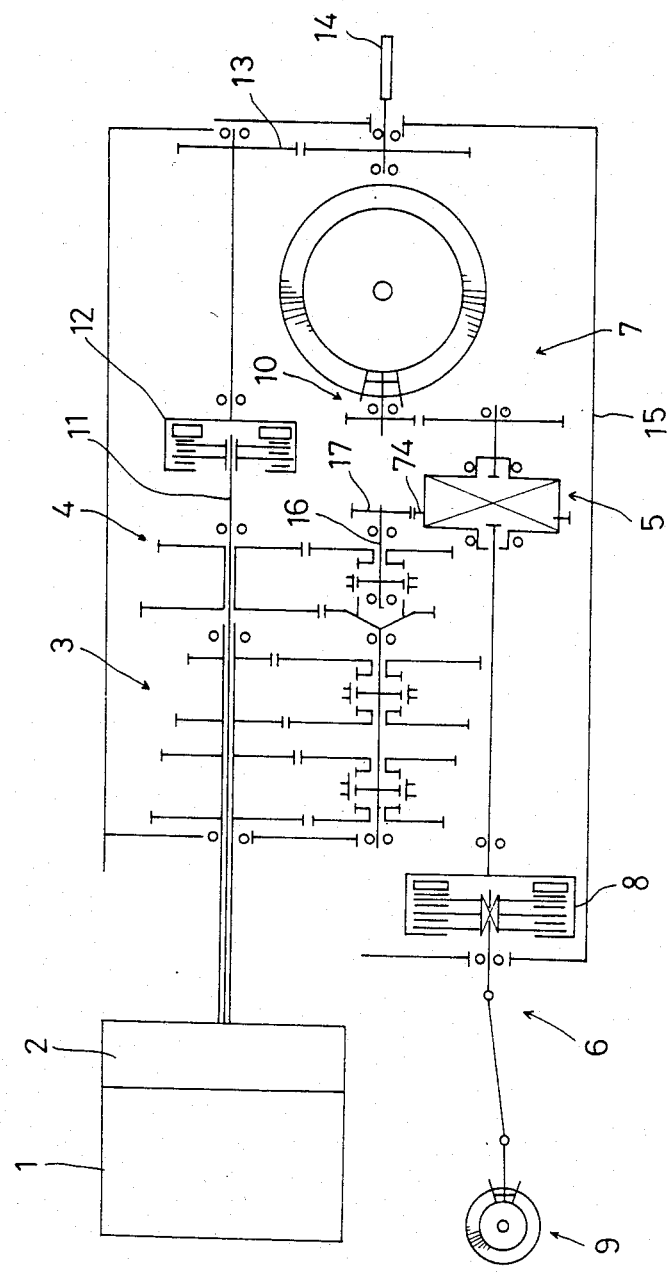
FIG. 1 is a schematic view of a transmission system for a four wheel drive vehicle according to a first embodiment of the present invention.

FIG. 1 shows a transmission system for a four wheel drive tractor embodying the present invention. The transmission system includes a propelling drive transmission line and a power takeoff line. In the propelling drive transmission line, the drive of an engine 1 is transmitted by way of a main clutch 2, a main change speed mechanism 3 and an auxiliary change speed mechanism 4 to an automatic switch mechanism 5 for selectively providing a two wheel drive mode and a four wheel drive mode. The switch mechanism 5 is operatively connected, on the one hand, to front wheel drive means 6 for driving front wheels and, on the other hand, to rear wheel drive means 7 for driving rear wheels. The front wheel drive means 6 includes a front wheel drive clutch 8, a front differential 9, and an unillustrated reduction mechanism disposed downstream of the front differential 9 and operatively connected to the front wheels. The rear wheel drive means 7 includes a rear differential 10 operatively connected to the rear wheels not shown.

In the power takeoff line, the drive of engine 1 is transmitted by way of a power takeoff intermediate shaft 11 extending through the main and auxiliary change speed mechanisms 3 and 4, a power takeoff clutch 12 and a power takeoff change speed mechanism 13 to a power takeoff shaft 14.

Figure 2:
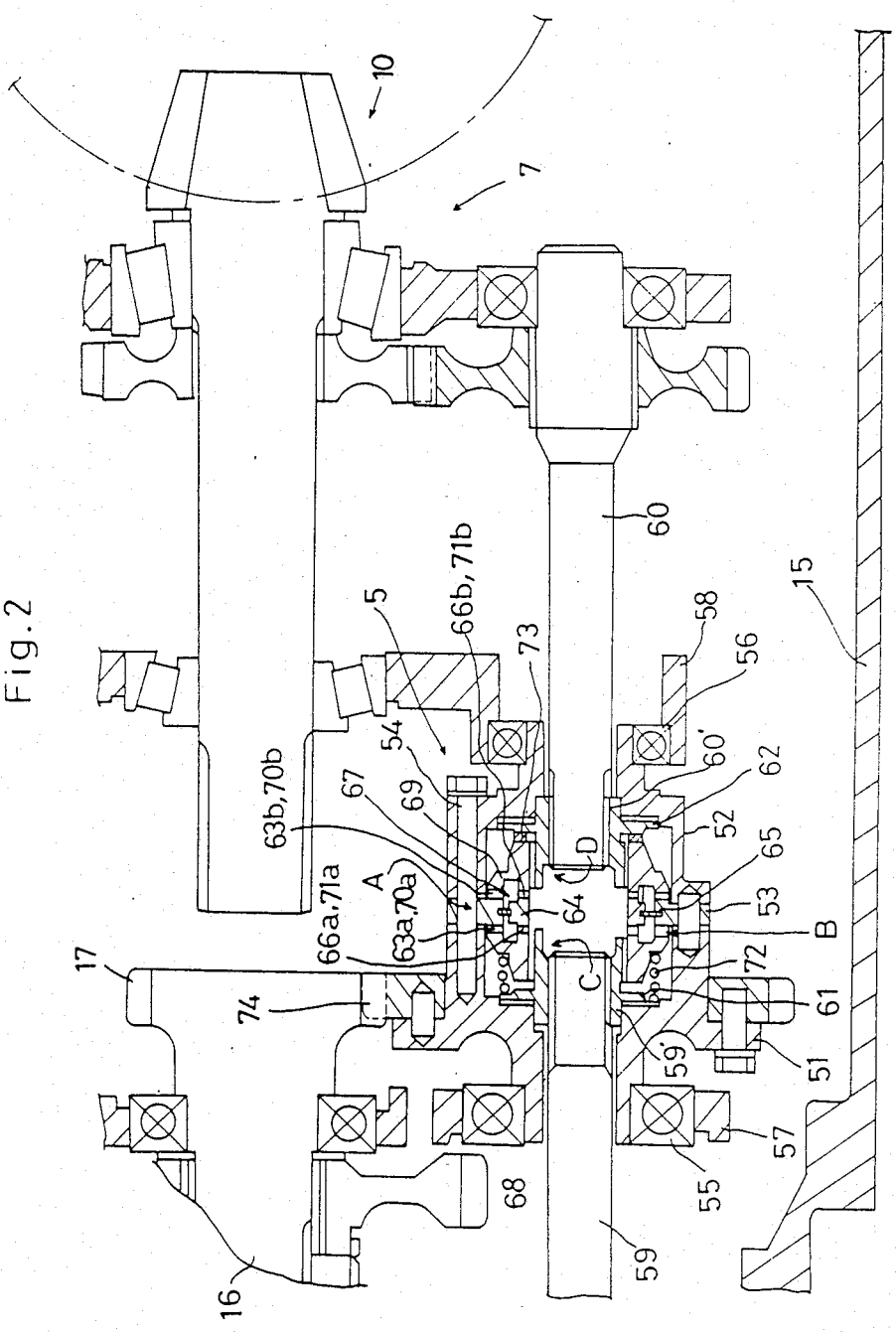
FIG. 2 is a sectional view of a region of the transmission system including an automatic switch mechanism for switching between a two wheel drive mode and a four wheel drive mode.

The automatic switch mechanism 5 for selectively providing a two wheel drive mode and a four wheel drive mode will be described in detail hereinafter with reference to FIG. 2. This switch mechanism 5 has a a basic construction similar to that of an automatic differential lock mechanism known as the no spin differential.

The switch mechanism 5 includes a first case 51, a second case 52 and an annular center clutch member 53 sandwiched between the first and second cases 51, 52. The two cases 51, 52 and the center clutch member 53 are rigidly connected together by bolts 54. The first and second cases 51, 52 are rotatably supported at opposite remote ends thereof by partition walls 57 and 58 of a transmission case 15 through bearings 55 and 56. A first output shaft 59 connected to the front wheel drive means 6 has an end thereof extending into a rotational center portion of the first case 51 to be rotatable relative thereto. A second output shaft 60 connected to the rear wheel drive means 7 has an end thereof extending into a rotational center portion of the second case 52 to be rotatable relative thereto. That is to say, the first and second output shafts 59 and 60 are coaxially disposed with end faces opposed to each other inside the first and second cases 51, 52 of the switch mechanism 5.

The first output shaft 59 and second output shaft 60 define splines on mutually opposed ends thereof, and a first and a second spline sleeves 59', 60' are fitted on these splines, respectively. The first spline sleeve 59' has a flange 61 in contact with an inside wall of the first case 51, and the second spline sleeve 60' has a flange 62 in contact with an inside wall of the second case 52, whereby the first and second spline sleeves 59', 60' are held against radially outward movement.

The annular center clutch member 53 defines rectangular clutch teeth 63a and 63b on opposite end faces thereof, respectively, the clutch teeth 63a and 63b being equidistantly arranged in the peripheral direction of the end faces (see also FIG. 3).

An annular center cam member 64 is disposed inside and concentric with the center clutch member 53. The center clutch member 53 and center cam member 64 are connected to each other by a snap ring 65 for relative rotation by a fixed amount set in the peripheral direction.

The center cam member 64 defines trapezoidal cam teeth 66a and 66b on opposite end faces thereof, respectively, the cam teeth 66a and 66b being equidistantly arranged in the peripheral direction of the end faces so as to correspond with the clutch teeth 63a and 63b (see also FIG. 4).

The center clutch member 53 and center cam member 64 together constitute a center section 67, and a first side member 68 and a second side member 69 are disposed in a mutually opposed relationship with the center section 67 in between.

The side members 68 and 69 define, on respective end faces thereof opposed to the center section 67, clutch teeth 70a and 70b for engagement with the clutch teeth 63a and 63b with spaces S therebetween in the peripheral direction (FIG. 3), and cam teeth 71a and 71b for engagement with the cam teeth 66a and 66b without any spaces in the peripheral direction.

The side members 68 and 69 are splined to the first and second spline sleeves 59' and 60' to be axially movable relative to the spline sleeves 59' and 60'.

A biasing means comprising a compression coil spring 72 is mounted between the first side member 68 and the flange 61 of the first spline sleeve 59' mounted on the end of the first output shaft 59, for biasing the first side member 68 toward the center section 67 to maintain the engagement between the clutch teeth 63a and 70a and the engagement between the cam teeth 66a and 71a.

A biasing means comprising a washer 73 is mounted between the second side member 69 and the second spline sleeve 60' mounted on the end of the second output shaft 60 for constantly maintaining the second side member 69 in contact with the center section 67. Thus, the clutch teeth 63b and 70b and the cam teeth 66b and 71b of the second spline sleeve 60' connected to the second output shaft 60 and the center section 67 are maintained in rigid engagement at all times.

The first case 51 carries and input gear 74 fixed thereto. The input gear 74 is in constant mesh with a gear 17 provided on an output shaft 16 of the auxiliary change speed mechanism 4.

Thus, the described automatic switch mechanism 5 for selectively providing the two wheel drive mode and the four wheel drive mode comprises an input portion A including the input gear 74, the first and second cases 51, 52, and the center clutch member 53, a clutch means B including the snap spring 65, the center cam member 64, the first and second side members 68, 69 and the compression spring 72, a first output portion C including the first spline sleeve 59' and the first output shaft 59, and a second output portion D including the second spline sleeve 60' and the second output shaft 60.

According to this construction, the center section 67 of the automatic switch mechanism 5 receives the drive of the engine 1 transmitted by way of the main change speed mechanism 3, the auxiliary change speed mechanism 4, and the pair of gears 17 and 74. The drive is divided at the center section 67 into two parts, one of which is transmitted from the center section 67 to the front wheel drive means 6 by way of the first side member 68, the first spline sleeve 59' and the first output shaft 59, and the other from the center section 67 to the rear wheel drive means 7 by way of the second side member 69, the second spline sleeve 60' and the second output shaft 60.

It will be noted that, since the first side member 68 for transmitting the drive to the front wheel drive means 6 is biased by the spring 72, the drive transmission from the center section 67 to the first side member 68 may be broken by sliding the first side member 68 against the biasing force of spring 72. In other words, the clutch teeth 63a, 70a and cam teeth 66a, 71a between the center section 67 and first side member 68, and the spring 72 all constitute clutch elements.

The front wheel drive means 6 and the rear wheel drive means 7 are constructed such that the front and rear wheels have a speed ratio formulated as 0.9 < (front wheel vehicle speed)/(rear wheel vehicle speed) < 1. That is to say the front wheels have a lower vehicle speed than the rear wheels when the first output shaft 59 and the second output shaft 60 rotate in the equal ratio of 1:1.

Therefore, when the center section 67 is driven by the drive of the engine in the direction indicated by thick arrows in FIGS. 3 and 4, the clutch teeth 63a and 63b of the center section 67 engage and transmit the drive to the clutch teeth 70a and 70b of the first and second side members 68 and 69, and the cam teeth 66a and 66b of the center section 67 are maintained in engagement with the cam teeth 71a and 71b of the respective side members 68 and 69.

However, since the vehicle speed of the front wheels are set to be lower than the vehicle speed of the rear wheels, the front wheels are pushed forward by the rear wheels and tend to rotate faster than the set speed under a propulsive force imparted from the ground. Then, as shown in FIGS. 5 and 6, the first side member 68 tends to rotate ahead within the spaces S defined in the peripheral direction between the clutch teeth 63a and 70a, and this relative high speed rotation causes the cam teeth 71a of the first side member 68 and the cam teeth 66a of the center section 67 to mount each other against the biasing force of the spring 72. This in turn causes the first side member 68 to make a sliding movement and break the engagement between the clutch teeth 63a and 70a, thereby placing the front wheels in free rotation.

Thus, the tractor is driven only by the rear wheels at times of straight running with the engine providing the drive. In this state, the front wheels are rotated through contact with the ground. This is the case also when the tractor makes a turn.

However, when in this state the rear wheels become bogged down and slip in a muddy ground for example, the tractor stops advancing, the front wheels no longer receive the propulsive force from the ground and the rotational rate of the first output shaft 59 is lowered. When the rotational rate of the first output shaft 59 becomes equal to that of the second output shaft 60, the clutch means B assumes the engaging state shown in FIGS. 3 and 4 thereby to transmit the engine drive to the front wheels. In other words, when the rear wheels slip, the four wheel drive mode is provided wherein both the front and rear wheels are driven by the engine.

Figure 7:
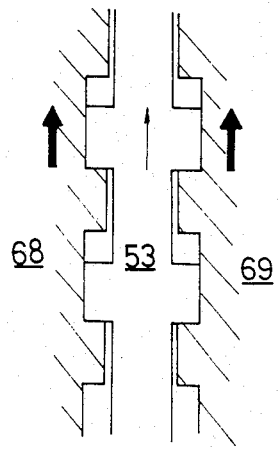
Figure 8:
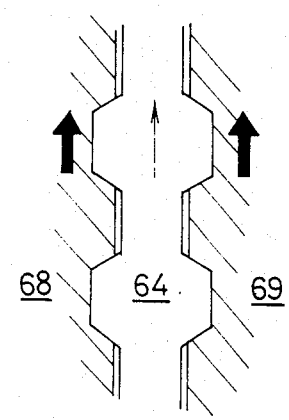
Figure 9:
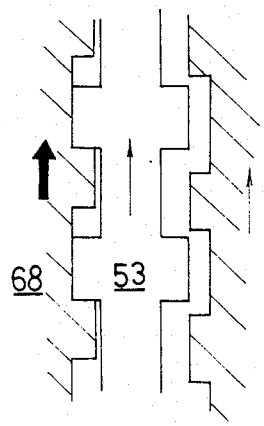
Figure 10:
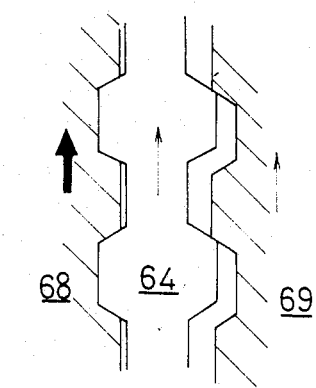

On the other hand, when an engine brake is applied, the drive is transmitted from both side members 68 and 69 to the center section 67 as shown in FIGS. 7 and 8. Since at this time the speed ratio of the front wheels with respect to the rear wheels is below 1, the rotational rate of the second output shaft 60 tends to become lower than that of the first output shaft 59. If the second side member 69 for transmitting the drive to the rear wheels were provided with a sliding range and biased by a spring as is the first side member 68, the drive transmission between the center section 67 and the second side member 69 would be broken. In this embodiment, however, the second side member 69 is held in contact with the second spline sleeve 60' by means of washer 73 without any freedom to make a sliding movement. Therefore, the state shown in FIGS. 7 and 8 is maintained instead of changing into a state as shown in FIGS. 9 and 10, whereby the engine brake acts on both front and rear wheels. Thus, when the engine brake is applied, a slippage will occur between the rear wheels or front wheels and the ground.

Figures 11, 12:
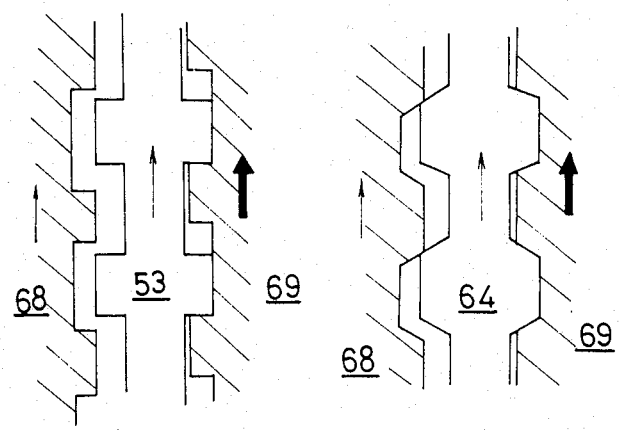
Figure 14:
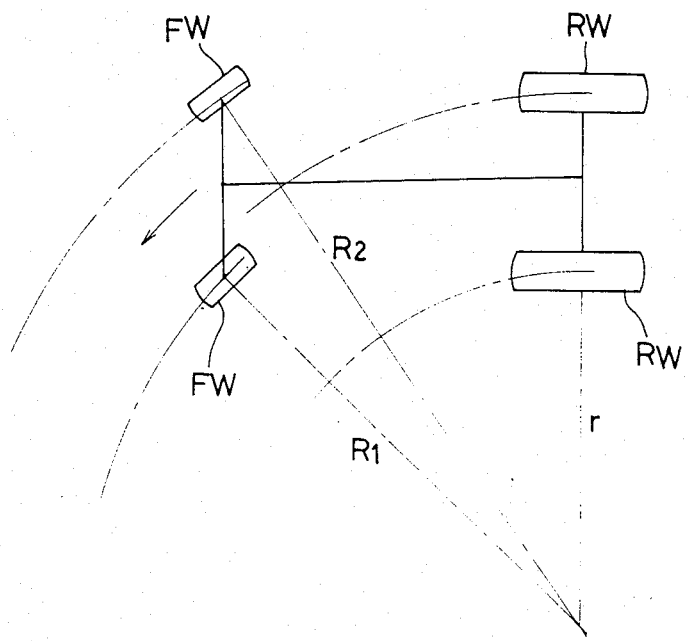
FIG. 14 is an explanatory view illustrating a difference in speed between front wheels and rear wheels at a vehicle turning time.

If the front wheels slip for some reason and the rotational rate of the first output shaft 59 falls below that of the second output shaft 60 when the engine brake is applied, a relative rotation will occur between the center section 67 and the first side member 68, causing the cam teeth 66a and 71a to mount each other as shown in FIGS. 11 and 12. This causes the first side member 68 to make the sliding movement and disengage the clutch teeth 63a and 73a, whereby the engine brake acts only on the rear wheels.

FIG. 13 shows another embodiment of the present invention. This embodiment differs from the foregoing embodiment in that the rear wheel drive means 7 is rigidly connected to the output shaft 16 of the auxiliary change speed mechanism 4, that the second side member 69 is provided with a freedom of sliding movement and biased by a compression spring 72 as is the first side member 68, and that the second output shaft 60 carries a propeller 18 attached to a rear end portion thereof for agitating lubricating oil in the transmission case 15. This second embodiment having the above features performs the same function as the first embodiment.

More particularly, as in the case of the first embodiment, the drive of the engine is transmitted to the automatic switch mechanism 5 for selectively providing the two wheel drive mode and four wheel drive mode. Thereafter the drive is divided into two parts, one of which is transmitted from the center section 67 through the first side member 68, the first spline sleeve 69 and the first output shaft 59 to the front wheel drive means 6 for driving the front wheels, and the other is transmitted from the center section 67 through the second side member 69 and the second spline sleeve 70 to the second output shaft 60 for rotating the propeller 18. The rear wheel drive means 7 is driven directly by the output shaft 16 of the auxiliary change speed mechanism 4.

The switch mechanism 5 in this embodiment is operable to perform the same switching function as already described with reference to FIGS. 3 through 12. It will be noted that the center section 67 must not rotate together with the first side member 68 when the cam teeth 71a of the first side member 68 mount the cam teeth 71a of the center cam member 64. The propeller 18 mounted on the second output shaft 60 acts to impart a resistance for preventing the center section 67 from rotating with the first side member 68. It is therefore possible to replace the propeller 18 mounted on the second output shaft 60 with friction plates or the like for imparting the resistance.

Furthermore, the second output shaft 60 may be utilized as an additional power takeoff shaft.

What is claimed is:

1. A four wheel drive vehicle comprising;
   an engine (1),
   transmission means (2, 3, 4) connected to the engine,
   a front wheel drive mechanism (6) and a rear wheel drive mechanism (7) driven by a drive output from the transmission means, the front wheel and rear wheel drive mechanisms driving front wheels at a lower speed than rear wheels, and
   an automatic switching mechanism (5) for selectively providing a two wheel drive mode and a four wheel drive mode, the automatic switching mechanism including:
   an input portion (A) connected to the transmission means,
   a first output portion (C) having a first output shaft (59) connected to the front wheel drive mechanism,
   a second output portion (D) having a second output shaft (60) subjected to a rotational load, and
   clutch means mounted between said input portion (A) and said output portions (C, D) and having:
   a center section having a center clutch member (53) and a cam member (64) constituting a relatively rotatably supported outer and inner ring construction, said center clutch member (53) defining clutch teeth (63a, 63b) on opposite end faces thereof, said center cam member (64) defining cam teeth (66a, 66b) on opposite end faces thereof, said center clutch member (53) being fixed to said input portion (A),
   a first side member and a second side member (68, 69) mounted on said first and second output portions (C, D), respectively, and opposed to each other across said center section, said first and second side members defining clutch teeth (70a, 70b) on faces thereof opposed to said center section for meshing with said clutch teeth of said center clutch member with spaces defined therebetween in a peripheral direction, and cam teeth (71a, 71b) on the faces thereof opposed to said center section for meshing with said cam teeth of said center cam member without spaces in said peripheral direction, said first side member (68) and/or said second side member (69) being relatively unrotatably slidable on said first output portion (C) and/or said second output portion (D), and
   means (72) for biasing said first side member (68) and/or said second side member (69) toward said center section, said cam teeth of the center cam member and said cam teeth of said first and/or said second side members being mutually mountable with relative rotation between said center section and said first and/or second side members, thereby to disengage said clutch teeth of said side members from said clutch teeth of said center clutch member,
   wherein said clutch means is operable to disconnect said first output shaft (59) from said input portion (A) when said input portion (A) rotates at a lower speed than said first output shaft (59) at a time said vehicle is driven by said engine with power transmission occurring from said input portion (A) to said output portions (C and/or D), and when said input portion (A) rotates at a higher speed than said first output shaft (59) at a time the vehicle is braked by said engine with power transmission occurring from said output portions (C and/or D) to said input portion (A).

2. A four wheel drive vehicle as claimed in claim 1 wherein said front wheel drive mechanism is connected to said second output shaft.

3. A four wheel drive vehicle as claimed in claim 1 wherein said rear wheel drive mechanism is directly connected to said transmission means, said second output shaft carrying a propeller for agitating lubricating oil.

4. A four wheel drive vehicle as claimed in claim 1 wherein said rear wheel drive mechanism is directly connected to said transmission means, said second output shaft being utilized as a power takeoff shaft.

* * * * *